United States Patent
Prasad (10) Patent No.: US 11,519,294 B2
(45) Date of Patent: Dec. 6, 2022

(54) AIRCRAFT PROPULSION SYSTEM WITH VAPOR ABSORPTION REFRIGERATION SYSTEM

(71) Applicant: United Technologies Corporation, Farmington, CT (US)

(72) Inventor: Dilip Prasad, North Granby, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 445 days.

(21) Appl. No.: 16/693,667

(22) Filed: Nov. 25, 2019

(65) Prior Publication Data
US 2021/0156277 A1    May 27, 2021

(51) Int. Cl.
| | |
|---|---|
| *F01D 25/12* | (2006.01) |
| *F02C 6/18* | (2006.01) |
| *F25B 25/02* | (2006.01) |
| *B64D 33/08* | (2006.01) |

(52) U.S. Cl.
CPC ........... *F01D 25/125* (2013.01); *B64D 33/08* (2013.01); *F02C 6/18* (2013.01); *F25B 25/02* (2013.01); *F05D 2240/50* (2013.01); *F05D 2260/213* (2013.01)

(58) Field of Classification Search
CPC .......... F01D 25/125; F02C 6/18; F25B 25/02; F05D 2240/50; F05D 2260/213; B64D 33/08
See application file for complete search history.

(56) References Cited

U.S. PATENT DOCUMENTS

| | | | |
|---|---|---|---|
| 2005/0235651 A1* | 10/2005 | Morris | F01D 25/125 60/39.08 |
| 2008/0022683 A1* | 1/2008 | Ohler | F02C 7/10 60/645 |
| 2013/0081394 A1* | 4/2013 | Perry | F22B 1/028 126/610 |
| 2014/0260340 A1 | 9/2014 | Vaisman | |
| 2016/0123229 A1* | 5/2016 | Tang | F25B 15/02 62/310 |
| 2017/0167382 A1 | 6/2017 | Miller | |
| 2017/0217592 A1 | 8/2017 | Hinderliter | |
| 2018/0080688 A1 | 3/2018 | Snape | |
| 2018/0229849 A1 | 8/2018 | Behrens | |
| 2019/0049156 A1 | 2/2019 | Vaisman | |

FOREIGN PATENT DOCUMENTS

| | | | |
|---|---|---|---|
| JP | 2013253747 A | * | 12/2013 |
| JP | 2013253747 A | | 12/2013 |
| WO | 9914538 W | | 3/1999 |

OTHER PUBLICATIONS

English Translation JP 2013253747A (Year: 2013).*
EP search report for EP20209810.9 dated Jun. 16, 2021.

* cited by examiner

*Primary Examiner* — Shafiq Mian
(74) *Attorney, Agent, or Firm* — Getz Balich LLC (57) ABSTRACT

An assembly is provided for an aircraft propulsion system. This assembly includes a gas turbine engine and a vapor absorption refrigeration system. The gas turbine engine includes a turbine section. The vapor absorption refrigeration system is configured to be driven by waste heat energy received from the turbine section. The vapor absorption refrigeration system includes a condenser.

16 Claims, 5 Drawing Sheets

AIRCRAFT PROPULSION SYSTEM WITH VAPOR ABSORPTION REFRIGERATION SYSTEM

BACKGROUND OF THE DISCLOSURE

1. Technical Field

This disclosure relates generally to an aircraft propulsion system and, more particularly, to systems and methods for utilizing heat energy generated by a gas turbine engine.

2. Background Information

A gas turbine engine for an aircraft propulsion system generates significant amounts of heat energy during operation. Most of this heat energy is typically expelled/rejected from the aircraft propulsion system through gas exhausted from the gas turbine engine. This heat energy may thereby be referred to as "waste heat energy" as it is not further utilized in aircraft propulsion system operation. In order to increase aircraft propulsion system efficiency, there is a need in the art for systems and methods operable to utilize waste heat energy in aircraft propulsion system operation.

SUMMARY OF THE DISCLOSURE

According to an aspect of the present disclosure, an assembly is provided for an aircraft propulsion system. This assembly includes a gas turbine engine and a vapor absorption refrigeration system. The gas turbine engine includes a turbine section. The vapor absorption refrigeration system is configured to be driven by waste heat energy received from the turbine section. The vapor absorption refrigeration system includes a condenser.

According to another aspect of the present disclosure, another assembly is provided for an aircraft propulsion system. This assembly includes a gas turbine engine and a vapor absorption refrigeration system. The gas turbine engine includes a turbine section. The vapor absorption refrigeration system is configured to be driven by heat energy of gas flowing through the turbine section. The vapor absorption refrigeration system is configured as a closed-loop refrigerant system.

According to still another aspect of the present disclosure, another assembly is provided for an aircraft propulsion system. This assembly includes a gas turbine engine and a vapor absorption refrigeration system. The gas turbine engine includes a turbine section and a component. The vapor absorption refrigeration system is configured to use heat energy of gas flowing through the turbine section to drive a cooling cycle for a fluid flowing through the component. The vapor absorption refrigeration system includes a condenser, a first expansion device, an evaporator, an absorber and a generator configured in a closed refrigerant loop.

The vapor absorption refrigeration system may include a condenser configured to heat gas or liquid that flows within a component of the gas turbine engine.

The vapor absorption refrigeration system may also include a pump and a second expansion device. The absorber, the pump, the generator and the second expansion device may be configured in a closed absorbent loop.

The vapor absorption refrigeration system may be configured as a closed-loop refrigerant system.

The condenser may be configured to heat fluid that flows through a component of the gas turbine engine.

The gas turbine engine may also include a bypass duct. The component may be configured with the bypass duct.

The gas turbine engine may also include a fuel system. The component may be configured with the fuel system.

The vapor absorption refrigeration system may also include an evaporator fluidly coupled with the condenser. The evaporator may be configured to cool fluid that flows through a component of the gas turbine engine.

The component may be configured within the turbine section.

The gas turbine engine may also include a compressor section. The component may be configured within the compressor section.

The component may be configured as or otherwise include a bearing.

The gas turbine engine may also include a lubrication system. The component may be configured with the lubrication system.

The vapor absorption refrigeration system may also include an absorber fluidly coupled with the condenser. The absorber may be configured to generate absorber heat energy by introducing refrigerant vapor into an absorbent. The absorber may also be configured to heat fluid that flows through a component of the gas turbine engine using the absorber heat energy.

The vapor absorption refrigeration system may also include a generator. The generator may be configured to use the waste heat energy received from the turbine section to separate an absorbent-refrigerant mixture into refrigerant and an absorbent. The generator may also be configured to provide the refrigerant to the condenser.

The vapor absorption refrigeration system may also include an evaporator and an absorber. The evaporator may be configured to receive the refrigerant from the condenser and provide refrigerant vapor to the absorber while cooling a first fluid that flows through a first component of the gas turbine engine. The absorber may be configured to generate absorber heat energy by introducing the refrigerant vapor into the absorbent thereby providing the absorbent-refrigerant mixture. The absorber may also be configured to heat a second fluid that flows through a second component of the gas turbine engine using the absorber heat energy.

The vapor absorption refrigeration system may also include a heat exchanger configured to transfer heat energy between the absorbent-refrigerant mixture and the absorbent. The generator may be configured to receive the absorbent-refrigerant mixture from the absorber through the heat exchanger. The absorber may be configured to receive the absorbent from the generator through the heat exchanger.

The vapor absorption refrigeration system may also include an expansion valve. The absorber may be configured to receive the absorbent from the generator through the expansion valve.

The vapor absorption refrigeration system may also include a pump. The generator may be configured to receive the absorbent-refrigerant mixture from the absorber through the pump.

The present disclosure may include one or more of the features disclosed above and/or below alone or in any combination thereof.

The foregoing features and the operation of the invention will become more apparent in light of the following description and the accompanying drawings.

DETAILED DESCRIPTION

The present disclosure includes systems and methods for cooling at least one fluid within an aircraft propulsion system using a vapor absorption refrigeration system. The cooled fluid may be a gaseous fluid (e.g., air) and/or a liquid fluid (e.g., coolant and/or lubricant), examples of which are described below in further detail. An exemplary embodiment of the vapor absorption refrigeration system is illustrated in FIG. 1 and identified as 10.

Figure 1:
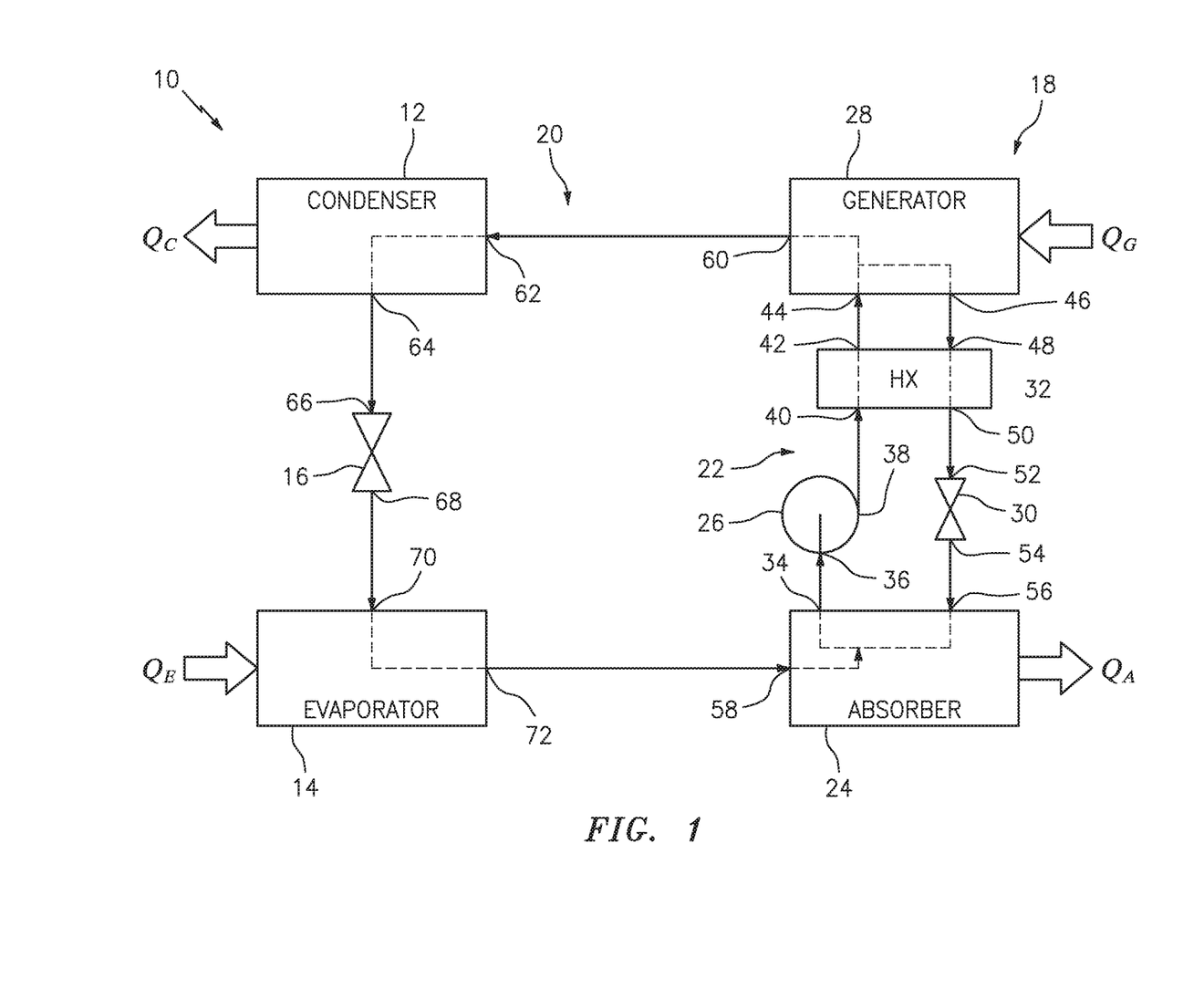
FIG. 1 is a schematic illustration of a vapor absorption refrigeration system.

The vapor absorption refrigeration system 10 of FIG. 1 includes a condenser 12, an evaporator 14, a first expansion device 16 (e.g., a thermal expansion valve (TEV)) and a vapor absorption system 18. The vapor absorption refrigeration system 10 also includes at least refrigerant and absorbent. As described below in further detail, the refrigerant circulates within a closed refrigerant loop 20 of the system and the absorbent circulates within a closed absorbent loop 22 of the system; see also FIG. 2.

The condenser 12 is configured to condense the refrigerant from a superheated gaseous state (e.g., superheated refrigerant) to a saturated liquid state (e.g., saturated liquid refrigerant). The condenser 12 may be configured as a refrigerant-to-liquid heat exchanger which facilitates transfer of heat energy from the refrigerant to another liquid such as, but not limited to, fuel or another liquid heat transfer fluid (e.g., another refrigerant). Alternatively, the condenser 12 may be configured as a refrigerant-to-gas heat exchanger which facilitates transfer of the heat energy from the refrigerant to a gas such as, but not limited to, air or another gaseous heat transfer fluid. The condenser 12 may be configured as a counterflow heat exchanger, a cross-flow heat exchanger, a parallel-flow heat exchanger or as any other type of condenser heat exchanger.

The evaporator 14 is configured to evaporate/vaporize the refrigerant from a gaseous-liquid state (e.g., vapor-liquid refrigerant) to a saturated gaseous state (e.g., saturated vapor refrigerant). The evaporator 14 may be configured as a refrigerant-to-liquid heat exchanger which facilitates transfer of heat energy to the refrigerant from another liquid such as, but not limited to, fuel or another liquid heat transfer fluid (e.g., another refrigerant). Alternatively, the evaporator 14 may be configured as a refrigerant-to-gas heat exchanger which facilitates transfer of the heat energy to the refrigerant from a gas such as, but not limited to, air or another gaseous heat transfer fluid. The evaporator 14 may be configured as a counterflow heat exchanger, a cross-flow heat exchanger, a parallel-flow heat exchanger or as any other type of evaporator heat exchanger.

The vapor absorption system 18 includes an absorber 24, a pump 26, a generator 28 and a second expansion device 30 (e.g., a thermal expansion valve (TEV)). The vapor absorption system 18 of FIG. 1 also includes a heat exchanger 32; however, in other embodiments, the heat exchanger 32 may be omitted.

The absorber 24 is configured to introduce the refrigerant vapor (e.g., saturated vapor refrigerant) into the absorbent such that the absorbent absorbs the refrigerant vapor and provides an absorbent-refrigerant mixture. The absorber 24 is also configured to transfer heat energy between the absorbent-refrigerant mixture and another (e.g., liquid and/or gas) heat transfer fluid. The process of absorption within the absorber 24 is an exothermic process. The absorber 24 is thereby configured to transfer the heat energy from the absorbent-refrigerant mixture to the other heat transfer fluid.

The generator 28 is configured to separate the absorbent-refrigerant mixture into its discrete components; e.g., the refrigerant and the absorbent. The generator 28 is also configured to transfer heat energy between the absorbent-refrigerant mixture and another (e.g., liquid and/or gas) heat transfer fluid. In particular, the generator 28 is configured to use the heat energy received from the other heat transfer fluid to separate the refrigerant from the absorbent. The heat energy, for example, may be used to boil off the refrigerant from the absorbent such that the refrigerant vapor and the liquid absorbent may be separately collected.

The heat exchanger 32 is configured to transfer heat energy to the absorbent-refrigerant mixture from the absorbent. The heat exchanger 32 may be configured as a counterflow heat exchanger, a cross-flow heat exchanger, a parallel-flow heat exchanger or as any other type of heat exchanger.

The elements 24, 26, 28, 30 and 32 of the vapor absorption system 18 of FIG. 1 are arranged together to provide the closed absorbent loop 22. The term "closed absorbent loop" may describe a loop or circuit which recirculates the same absorbent. Thus, during normal operation, absorbent is not extracted from or added to the loop or circuit.

An absorbent-refrigerant mixture outlet 34 of the absorber 24 is fluidly coupled to an inlet 36 of the pump 26. An outlet 38 of the pump 26 is fluidly coupled with an absorbent-refrigerant mixture inlet 40 of the heat exchanger 32. An absorbent-refrigerant mixture outlet 42 of the heat exchanger 32 is fluidly coupled with an absorbent-refrigerant mixture inlet 44 of the generator 28. The absorbent-refrigerant mixture inlet 44 of the generator 28 is thereby fluidly coupled with the absorbent-refrigerant mixture outlet 34 of the absorber 24 sequentially and serially through the pump 26 and the heat exchanger 32. An absorbent outlet 46 of the generator 28 is fluidly coupled to an absorbent inlet 48 of the heat exchanger 32. An absorbent outlet 50 of the heat exchanger 32 is fluidly coupled with an inlet 52 of the second expansion device 30. An outlet 54 of the second expansion device 30 is fluidly coupled with an absorbent inlet 56 of the absorber 24. The absorbent inlet 56 of the absorber 24 is thereby fluidly coupled with the absorbent outlet 46 of the generator 28 sequentially and serially through the heat exchanger 32 and the second expansion device 30.

The elements 12, 14, 24, 26, 28 and 32 of the vapor absorption refrigeration system 10 of FIG. 1 are also arranged together to provide the closed refrigerant loop 20. The term "closed refrigerant loop" may describe a loop or circuit which recirculates the same refrigerant. Thus, during normal operation, refrigerant is not extracted from or added to the loop or circuit.

A refrigerant inlet 58 of the absorber 24 is fluidly coupled with a refrigerant outlet 60 of the generator 28 sequentially and serially through the elements 26 and 32 as described above. The refrigerant outlet 60 of the generator 28 is fluidly coupled with a refrigerant inlet 62 of the condenser 12. A refrigerant outlet 64 of the condenser 12 is fluidly coupled with an inlet 66 of the first expansion device 16. An outlet 68 of the first expansion device 16 is fluidly coupled with a refrigerant inlet 70 of the evaporator 14. The refrigerant outlet 64 of the condenser 12 is thereby fluidly coupled with the refrigerant inlet 70 of the evaporator 14 serially through the first expansion device 16. A refrigerant outlet 72 of the evaporator 14 is fluidly coupled with the refrigerant inlet 58 of the absorber 24.

The refrigerant circulated through the refrigerant loop 20 may be or otherwise include water ($H_2O$). The absorbent circulated through the absorbent loop 22 may be or otherwise include lithium bromide (LiBr). The present disclosure, however, is not limited to the foregoing exemplary refrigerant and absorbent. For example, other combinations of refrigerant and absorbent include, but are not limited to, the refrigerant-absorbent groupings listed in Table 1 below.

TABLE 1

| Refrigerant | Absorbent |
| --- | --- |
| $H_2O$ | LiCl |
| $H_2O$ | $CaCl_2$ |
| $H_2O$ | NaOH |
| $NH_3$ | $H_2O$ |
| $NH_3$ | NaSCN |
| $NH_3$ | $LiNO_3$ |
| $H_2O$ | 1-ethyl-3-methylimidazolium dimethylphosphate |
| $CH_3OH$ | 1,3-methylimidazolium dimethylphosphate |
| R22 or R21 Refrigerant | Dimethyl Ether of Tetraethylene Glycol or Dimethyl Formamide |

Figure 2:
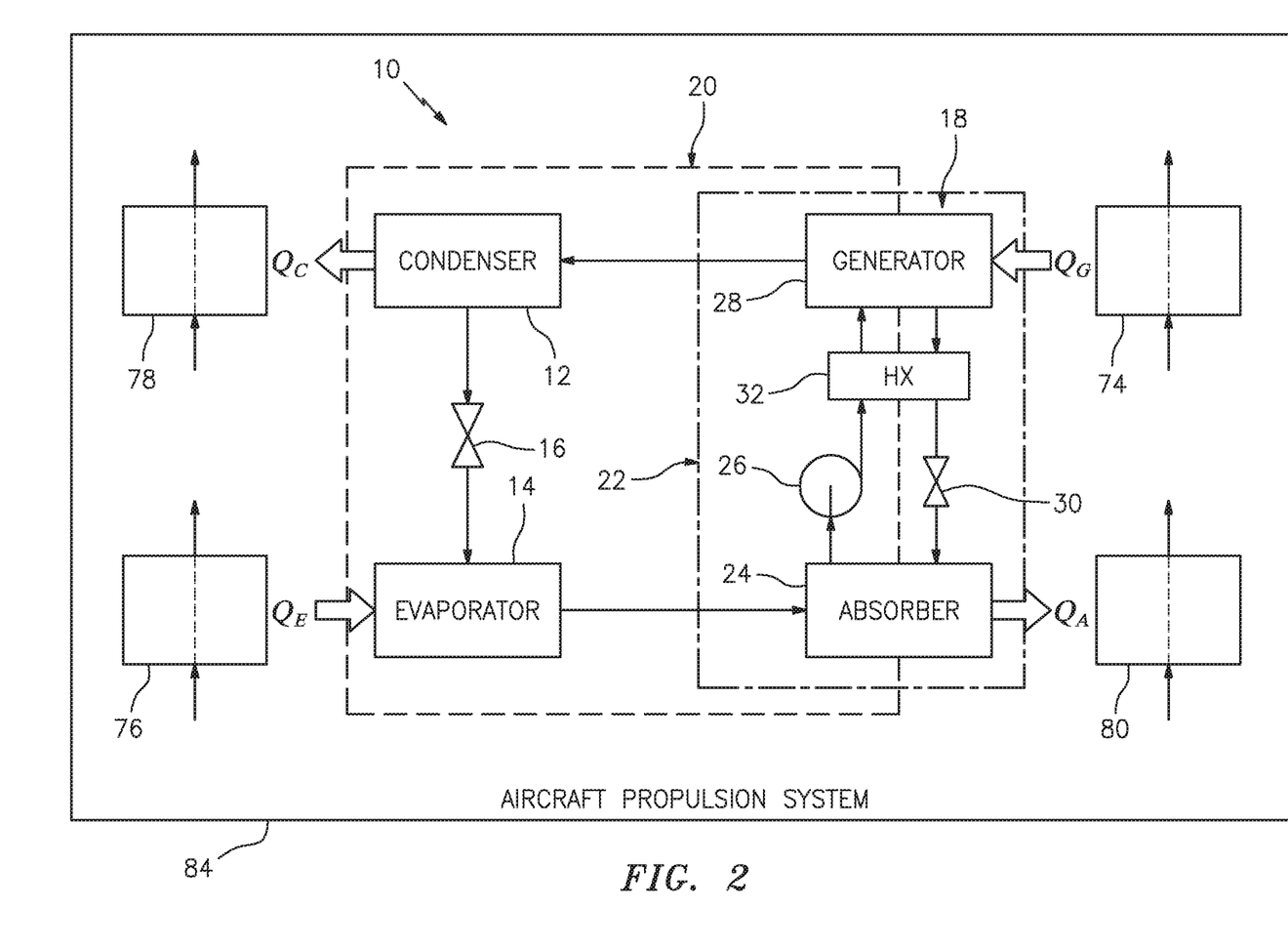
FIG. 2 is a schematic illustration of the vapor absorption refrigeration system configured with one or more components of an aircraft propulsion system.

Referring to FIG. 2, during operation of the vapor absorption refrigeration system 10, heat energy (e.g., waste heat energy; $Q_G$) received from at least a first fluid (e.g., core air) flowing through a generator associated component 74 (e.g., a turbine section) of the aircraft propulsion system may be used to drive a cooling cycle for cooling a second fluid (e.g., air, fuel or lubricant) flowing through an evaporator associated component 76 of the aircraft propulsion system.

The refrigerant is directed into the condenser 12 as a high-pressure vapor. The condenser 12 cools this refrigerant to a saturated liquid state. Condenser heat energy ($Q_C$) rejected from the cooled refrigerant in the condenser 12 is used to heat a third fluid flowing through a condenser associated component 78 of the aircraft propulsion system.

The first expansion device 16 receives the cool refrigerant from the condenser 12. The refrigerant expands through the first expansion device 16 to a lower pressure of the evaporator 14 undergoing Joule-Thomson cooling.

The evaporator 14 functions as a heat sink and thereby cools the second fluid flowing through the evaporator associated component 76. Evaporator heat energy ($Q_E$) received from the cooled second fluid raises the enthalpy of the refrigerant and the refrigerant may thereby leave the evaporator 14 as a saturated vapor—refrigerant vapor.

The absorber 24 receives the refrigerant vapor from the evaporator 14 and introduces the refrigerant vapor into the absorbent to provide the absorbent-refrigerant mixture. This absorption process is an exothermic process, thus requiring the removal of absorber heat energy ($Q_A$) from the absorbent. This absorber heat energy ($Q_A$) may then be used to heat a fourth fluid flowing through an absorber associated component 80 of the aircraft propulsion system.

The pressure of the absorbent-refrigerant mixture is raised to the generator 28 pressure using the pump 26.

In the generator 28, the waste heat energy ($Q_G$) is added at relatively high temperature to the high-pressure absorbent-refrigerant mixture causing refrigerant vapor to be released, which then passes to the condenser 12. The concentrated absorbent remains in the liquid state and is expanded through the second expansion device 30 to the absorber 24 pressure, undergoing cooling in the process.

The heat exchanger 32 transfers heat energy from the hot concentrated absorbent to the cooler absorbent-refrigerant mixture. This transfer may reduce the values of the heat energy ($Q_A$) and the heat energy $Q_G$ for a given amount of the heat energy ($Q_E$).

Figure 3:
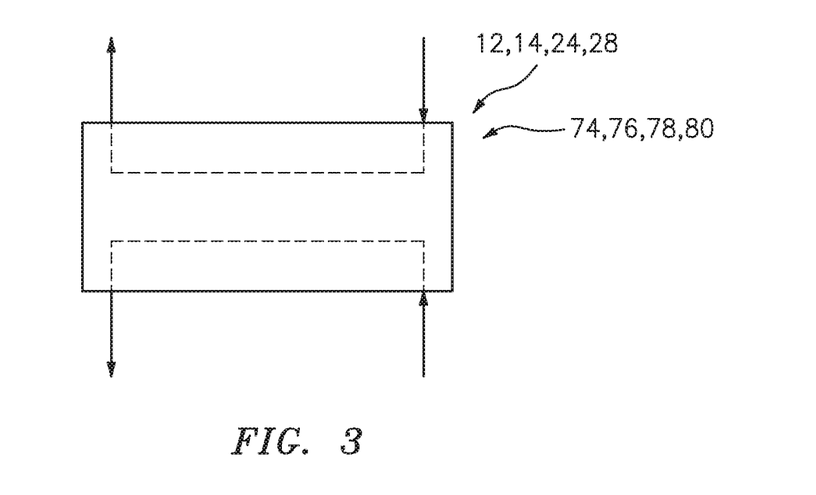
FIG. 3 is a schematic illustration of a heat exchange element of the vapor absorption refrigeration system configured with a component of the aircraft propulsion system.
Figure 4:
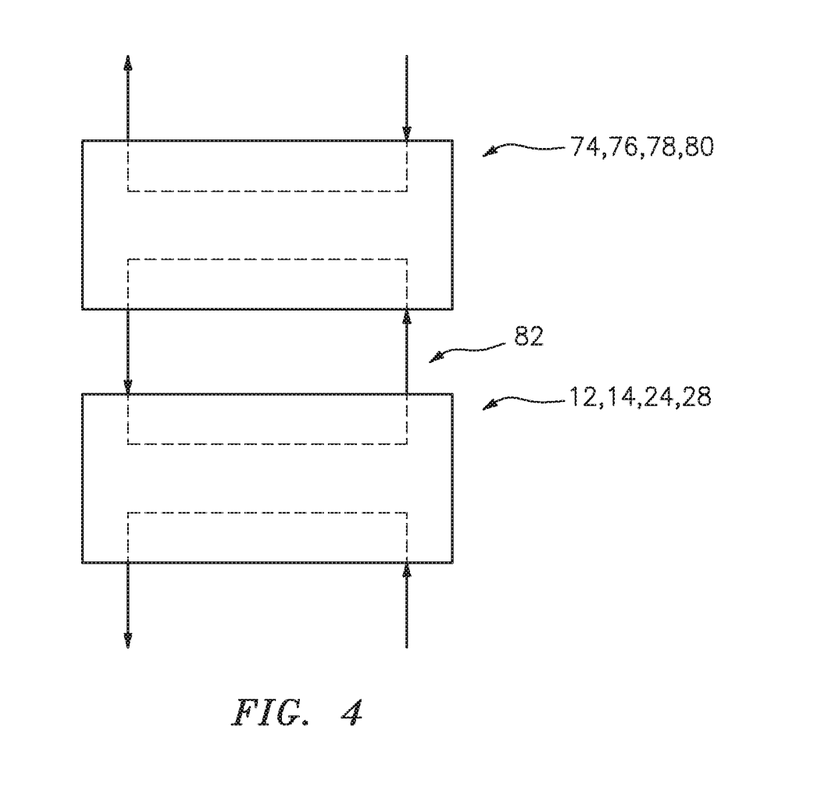
FIG. 4 is a schematic illustration of a heat exchange element of the vapor absorption refrigeration system in heat transfer communication with a component of the aircraft propulsion system.

As described above, various elements 12, 14, 24 and 28 of the vapor absorption refrigeration system 10 are operable to heat or cool fluid flowing through respective components 78, 76, 80 and 74 of the aircraft propulsion system. This heating/cooling may be a direct heating/cooling (e.g., see FIG. 3) or an indirect heating/cooling. For example, referring to FIG. 3, the vapor absorption refrigeration system element 12, 14, 24, 28 may be configured with (e.g., along a side of, within, part of, etc.) the component 78, 76, 80 and 74 such that the element 12, 14, 24, 28 directly transfers the heat energy between the refrigerant/absorbent fluid and the fluid to be heated or cooled. Alternatively, referring to FIG. 4, the vapor absorption refrigeration system element 12, 14, 24, 28 may be thermally coupled with the component 78, 76, 80, 74 through at least one intermediate heat transfer system 82 (e.g., an intermediate heat transfer circuit). With such an embodiment, the element 12, 14, 24, 28 may heat/cool the fluid without being located at (e.g., on, adjacent or proximate) the component 78, 76, 80, 74.

Figure 5:
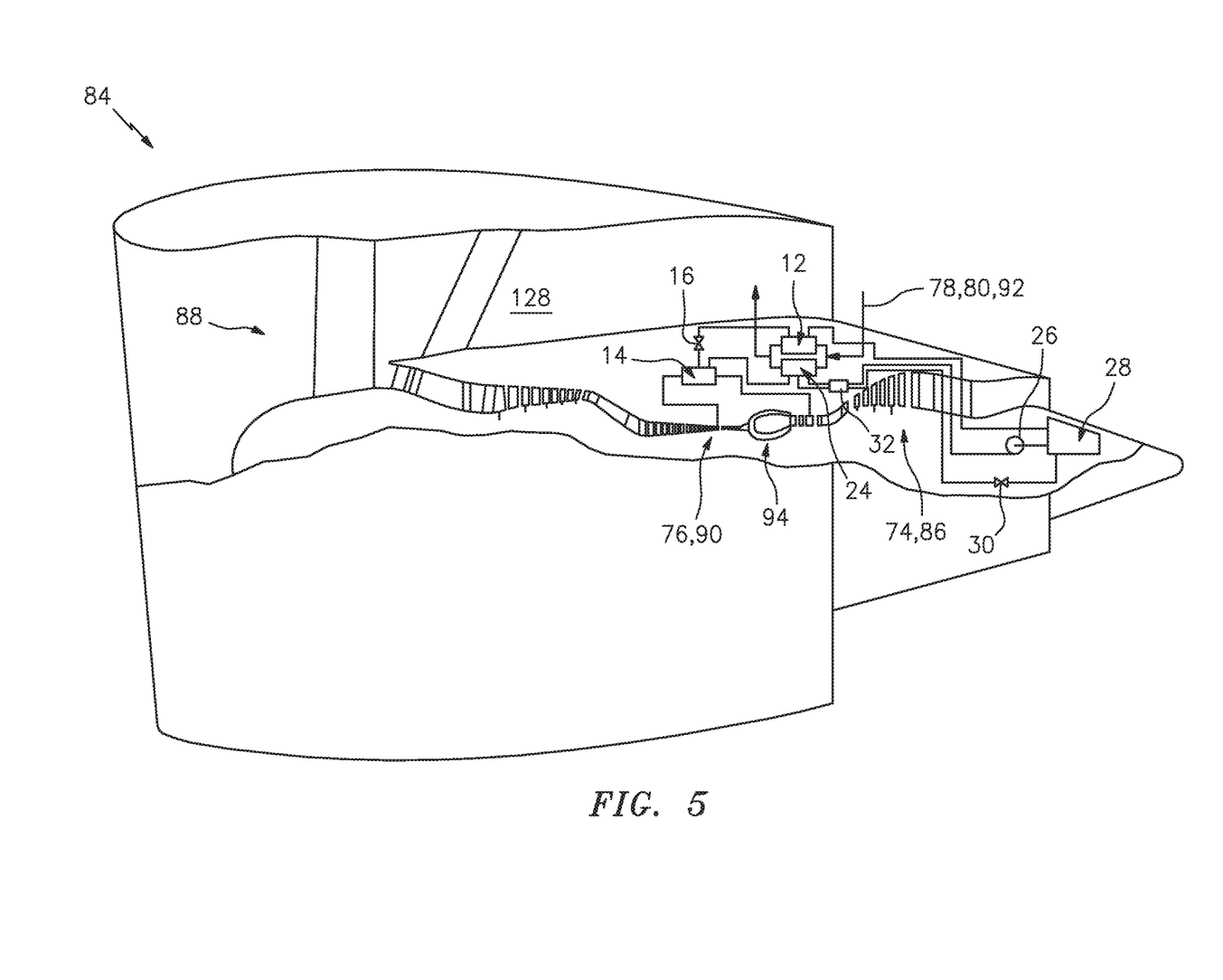
FIG. 5 is a schematic illustration of the vapor absorption refrigeration system configured with the aircraft propulsion system.

FIG. 5 illustrates an exemplary embodiment of the aircraft propulsion system, which is identified as 84. In this specific embodiment, the generator associated component 74 is configured with (e.g., in, a part of, etc.) a turbine section 86 of a gas turbine engine 88 included in the aircraft propulsion system 84 such that the first fluid is gas (e.g., core air) flowing through and/or exhausted from the turbine section 86. The evaporator associated component 76 is configured with (e.g., in, a part of, etc.) a compressor section 90 of the gas turbine engine 88 such that the second fluid is bleed air extracted from the compressor section 90. The condenser associated component 78 and the absorber associated component 80 are each configured with (e.g., in, a part of, etc.) a fuel system 92 for the gas turbine engine 88 such that the third fluid and the fourth fluid are both fuel flowing through the fuel system 92. With this arrangement, the vapor absorption refrigeration system 10 is configured to use waste heat energy from the turbine section 86 to cool compressed air being provided from the compressor section 90 to a turbine section 86 for cooling one or more components of the turbine section 86; e.g., turbine blades, turbine disks, turbine vanes, seal(s) within the turbine section 86 and/or bearing(s) beneath the turbine section 86.

The components 74, 76, 78 and/or 80 of the aircraft propulsion system 84, of course, may have various configurations and placements other than those described above. For example, in other embodiments, the evaporator associated component 76 may alternatively be configured with (e.g., in, a part of, etc.) another portion of the compressor section 90, the turbine section 86, a lubrication system for the gas turbine engine 88 and/or a cooling system for the gas turbine engine 88. The evaporator 14, for example, may also or alternatively be configured to cool cooling air for bearing(s) (e.g., see 96 in FIG. 6) within the compressor section 90, the turbine section 86 or a gear train (e.g., see 98 in FIG. 6). The evaporator 14 may be configured to cool cooling air for turbine section rotor blades and/or rotor disk(s). The evaporator 14 may be configured to cool lubricant provided to the bearing(s) (e.g., see 96 in FIG. 6) and/or the gear train (e.g., see 98 in FIG. 6). The evaporator 14 may be configured as or with an intercooler for cooling compressed core air between a low pressure compressor section and a high pressure compressor section of the gas turbine engine 88. In another example, the component 78 and/or 80 may each be configured with (e.g., in, a part of, etc.) a fan/bypass duct (e.g., see 100 in FIG. 6) for the gas turbine engine 88. The condenser 12 and/or the absorber 24, for example, may also or alternatively be configured to heat bypass air flowing through the bypass duct 100.

The vapor absorption refrigeration system 10 of the present disclosure has various benefits over various other heat energy recovery systems. For example, the vapor absorption refrigeration system 10 may be less complex, have a smaller footprint (e.g., volume) and/or weigh less than other heat energy recovery systems such as, but not limited to, bottoming steam systems and Organic Rankine Cycle (ORC) systems. In another example, the vapor absorption refrigeration system 10 is substantially heat driven (e.g., via the waste heat energy) whereas a typical vapor compressor system requires electricity and/or mechanical torque to power a compressor that drives its vapor compression cycle.

Figure 6:
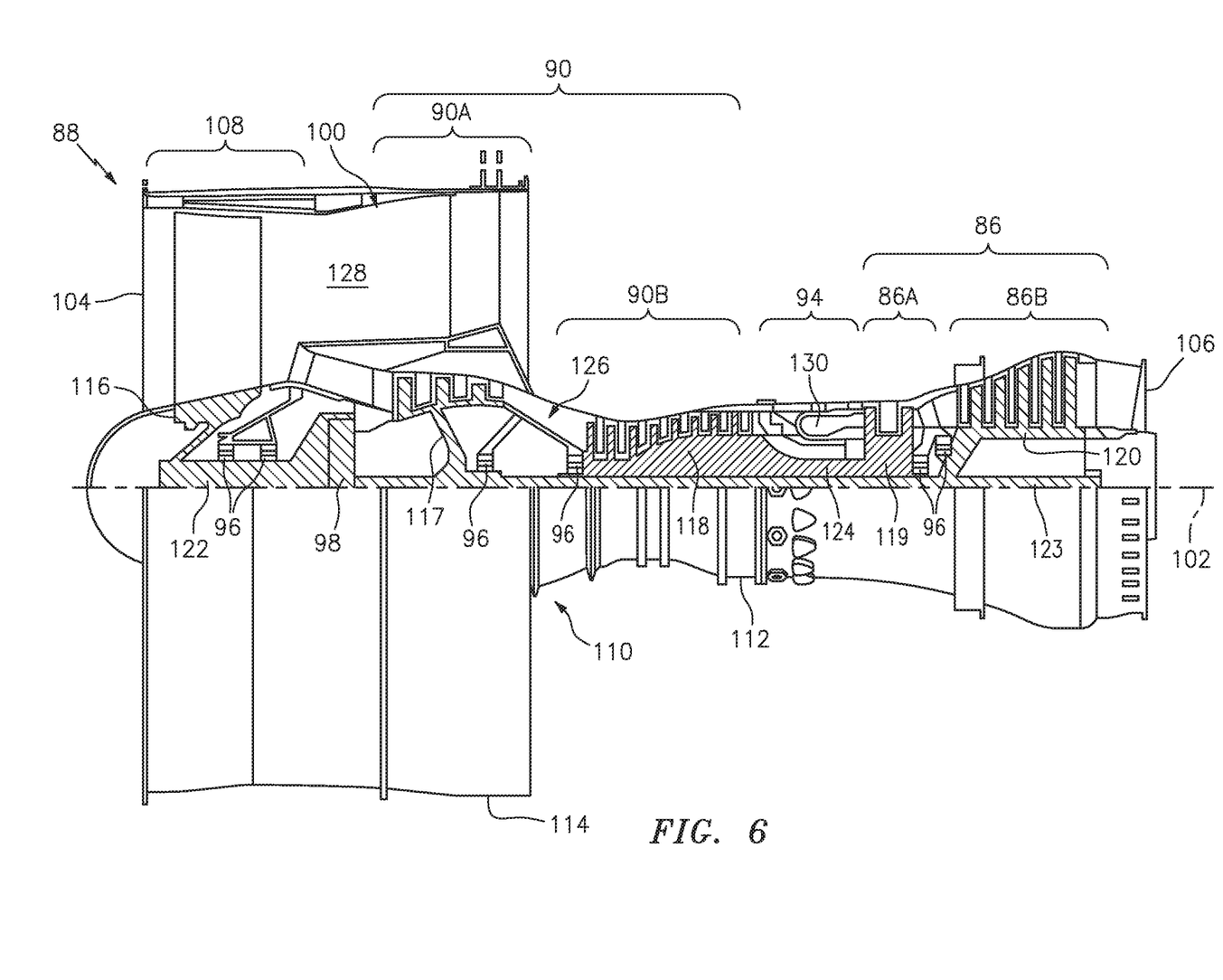
FIG. 6 is a side cutaway illustration of a gas turbine engine.

FIG. 6 is a side cutaway illustration of the gas turbine engine 88. This exemplary gas turbine engine 88 is a geared turbofan engine. The turbine engine 88 extends along an axial centerline 102 between an upstream airflow inlet 104 and a downstream airflow exhaust 106. The turbine engine 88 includes a fan section 108, the compressor section 90, the combustor section 94 and the turbine section 86. The compressor section 90 includes a low pressure compressor (LPC) section 90A and a high pressure compressor (HPC) section 90B. The turbine section 86 includes a high pressure turbine (HPT) section 86A and a low pressure turbine (LPT) section 86B.

The engine sections 108, 90A, 90B, 94, 86A and 86B are arranged sequentially along the centerline 102 within an engine housing 110. This housing 110 includes an inner case 112 (e.g., a core case) and an outer case 114 (e.g., a fan case). The inner case 112 may house one or more of the engine sections 90A, 90B, 94, 86A and 86B; e.g., an engine core. The outer case 114 may house at least the fan section 108.

Each of the engine sections 108, 90A, 90B, 86A and 86B includes a respective rotor 116-120. Each of these rotors 116-120 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 116 is connected to the gear train 98, for example, through a fan shaft 122. The gear train 98 and the LPC rotor 117 are connected to and driven by the LPT rotor 120 through a low speed shaft 123. The HPC rotor 118 is connected to and driven by the HPT rotor 119 through a high speed shaft 124. The shafts 122-124 are rotatably supported by the bearings 96; e.g., rolling element and/or thrust bearings. Each of these bearings 96 is connected to the engine housing 110 by at least one stationary structure such as, for example, an annular support strut.

During operation, air enters the turbine engine 88 through the airflow inlet 104. This air is directed through the fan section 108 and into a core gas path 126 and a bypass gas path 128. The core gas path 126 extends sequentially through the engine sections 90A, 90B, 94, 86A and 86B. The air within the core gas path 126 may be referred to as "core air". The bypass gas path 128 extends through the bypass duct 100 (see also FIG. 5), which bypasses the engine core. The air within the bypass gas path 128 may be referred to as "bypass air".

The core air is compressed by the compressor rotors 117 and 118 and directed into a combustion chamber 130 of a combustor in the combustor section 94. Fuel is injected into the combustion chamber 130 and mixed with the compressed core air to provide a fuel-air mixture. This fuel air mixture is ignited and combustion products thereof flow through and sequentially cause the turbine rotors 119 and 120 to rotate. The rotation of the turbine rotors 119 and 120 respectively drive rotation of the compressor rotors 118 and 117 and, thus, compression of the air received from a core airflow inlet. The rotation of the turbine rotor 120 also drives rotation of the fan rotor 116, which propels bypass air through and out of the bypass gas path 128. The propulsion of the bypass air may account for a majority of thrust generated by the turbine engine 88, e.g., more than seventy-five percent (75%) of engine thrust. The turbine engine 88 of the present disclosure, however, is not limited to the foregoing exemplary thrust ratio.

The vapor absorption refrigeration system 10 may be included in various turbine engines other than the one described above. The vapor absorption refrigeration system 10, for example, may be included in a geared turbine engine where a gear train connects one or more shafts to one or more rotors in a fan section, a compressor section and/or any other engine section. Alternatively, the vapor absorption refrigeration system 10 may be included in a turbine engine configured without a gear train. The vapor absorption refrigeration system 10 may be included in a geared or non-geared turbine engine configured with a single spool, with two spools (e.g., see FIG. 6), or with more than two spools. The turbine engine may be configured as a turbofan engine, a turbojet engine, a propfan engine, a pusher fan engine or any other type of turbine engine for propelling and/or powering an aircraft; e.g., an airplane or a helicopter. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft propulsion system, comprising:
   a gas turbine engine including a turbine section and a component; and
   a vapor absorption refrigeration system configured to be driven by waste heat energy received from the turbine section, the vapor absorption refrigeration system including a condenser;
   the condenser configured to heat fluid that flows through the component.

2. The assembly of claim 1, wherein the vapor absorption refrigeration system is configured as a closed-loop refrigerant system.

3. The assembly of claim 1, wherein the gas turbine engine further includes a bypass duct, and the component is configured with the bypass duct.

4. The assembly of claim 1, wherein the gas turbine engine further includes a fuel system, and the component is configured with the fuel system.

5. The assembly of claim 1, wherein
the gas turbine engine further includes a second component;
the vapor absorption refrigeration system further includes an evaporator fluidly coupled with the condenser; and
the evaporator is configured to cool fluid that flows through the second component.

6. The assembly of claim 5, wherein the second component is configured within the turbine section.

7. The assembly of claim 5, wherein the gas turbine engine further includes a compressor section, and the second component is configured within the compressor section.

8. The assembly of claim 5, wherein the second component comprises a bearing.

9. The assembly of claim 5, wherein the gas turbine engine further includes a lubrication system, and the second component is configured with the lubrication system.

10. An assembly for an aircraft propulsion system, comprising:
a gas turbine engine including a turbine section and a component; and
a vapor absorption refrigeration system configured to be driven by waste heat energy received from the turbine section, the vapor absorption refrigeration system including a condenser;
the vapor absorption refrigeration system further including an absorber fluidly coupled with the condenser; and
the absorber configured to generate absorber heat energy by introducing refrigerant vapor into an absorbent, and the absorber further configured to heat fluid that flows through the component using the absorber heat energy.

11. An assembly for an aircraft propulsion system, comprising:
a gas turbine engine including a turbine section and a component; and
a vapor absorption refrigeration system configured to be driven by waste heat energy received from the turbine section, the vapor absorption refrigeration system including a condenser;
the vapor absorption refrigeration system further including a generator; and
the generator configured to use the waste heat energy received from the turbine section to separate an absorbent-refrigerant mixture into refrigerant and an absorbent, and the generator further configured to provide the refrigerant to the condenser.

12. The assembly of claim 11, wherein
the gas turbine engine further includes a first component and a second component;
the vapor absorption refrigeration system further includes an evaporator and an absorber;
the evaporator is configured to receive the refrigerant from the condenser and provide refrigerant vapor to the absorber while cooling a first fluid that flows through a first component; and
the absorber is configured to generate absorber heat energy by introducing the refrigerant vapor into the absorbent thereby providing the absorbent-refrigerant mixture, and the absorber further configured to heat a second fluid that flows through a second component using the absorber heat energy.

13. The assembly of claim 12, wherein
the vapor absorption refrigeration system further includes a heat exchanger configured to transfer heat energy between the absorbent-refrigerant mixture and the absorbent;
the generator is configured to receive the absorbent-refrigerant mixture from the absorber through the heat exchanger; and
the absorber is configured to receive the absorbent from the generator through the heat exchanger.

14. The assembly of claim 12, wherein the vapor absorption refrigeration system further includes an expansion valve, and the absorber is configured to receive the absorbent from the generator through the expansion valve.

15. The assembly of claim 12, wherein the vapor absorption refrigeration system further includes a pump, and the generator is configured to receive the absorbent-refrigerant mixture from the absorber through the pump.

16. An assembly for an aircraft propulsion system, comprising:
a gas turbine engine including a turbine section and a component; and
a vapor absorption refrigeration system configured to use heat energy of gas flowing through the turbine section to drive a cooling cycle for a fluid flowing through the component;
the vapor absorption refrigeration system including a condenser, a first expansion device, an evaporator, an absorber and a generator configured in a closed refrigerant loop;
the vapor absorption refrigeration system further including a pump and a second expansion device; and
the absorber, the pump, the generator and the second expansion device configured in a closed absorbent loop.

* * * * *